United States Patent [19]

Tanaka et al.

[11] 4,285,333

[45] Aug. 25, 1981

[54] SOLAR ENERGY COLLECTING SYSTEM

[75] Inventors: Yasuo Tanaka; Kenji Shimokawa; Muneshige Nagatomo, all of Tokyo, Japan

[73] Assignee: Director-General of Agency of Industrial Science and Technology, Tokyo, Japan

[21] Appl. No.: 20,583

[22] Filed: Mar. 14, 1979

[30] Foreign Application Priority Data

Aug. 3, 1978 [JP] Japan .................................. 53/94158

[51] Int. Cl.³ .............................................. F24J 3/02
[52] U.S. Cl. .................................. 126/433; 126/422; 126/435; 126/437; 165/104.25; 62/235.1
[58] Field of Search ............... 126/435, 437, 434, 432, 126/433, 428, 419, 422; 165/31, 32, 37, 38, 107, 40, 485; 417/12, 292, 32; 62/2, 208; 236/24.5, 99 E

[56] References Cited

U.S. PATENT DOCUMENTS

| 2,575,478 | 11/1951 | Wilson | 126/435 X |
| 3,198,121 | 8/1965 | Schaub | 417/292 X |
| 3,382,917 | 5/1968 | Rice | 165/107 X |
| 3,390,672 | 7/1968 | Snelling | 126/433 |
| 4,044,820 | 8/1977 | Nobles | 165/107 X |
| 4,050,445 | 9/1977 | Huse | 126/433 X |
| 4,067,314 | 1/1978 | Bollefer | 126/433 X |
| 4,120,289 | 10/1978 | Bottum | 126/433 X |
| 4,143,642 | 3/1979 | Beaulieu | 126/435 X |
| 4,163,369 | 8/1979 | Owen | 62/208 X |
| 4,178,989 | 12/1979 | Takeshita et al. | 62/2 X |

Primary Examiner—Larry Jones
Attorney, Agent, or Firm—Sughrue, Mion, Zinn, Macpeak and Seas

[57] ABSTRACT

In a solar energy collecting system which comprises a primary closed circuit including a solar energy collector, a heat exchanger, a carrier fluid receiver tank, and a circulating pump and a secondary closed circuit including a utilization means and engaged with the primary closed circuit through the heat exchanger, a heat carrier used in the primary closed circuit is a fluid capable of evaporating at low temperature under low pressure and the control of the primary closed circuit is performed according to a surface temperature of the solar energy collector, a temperature of the carrier emanating from the collector and/or a pressure of the carrier in the primary closed circuit.

14 Claims, 1 Drawing Figure

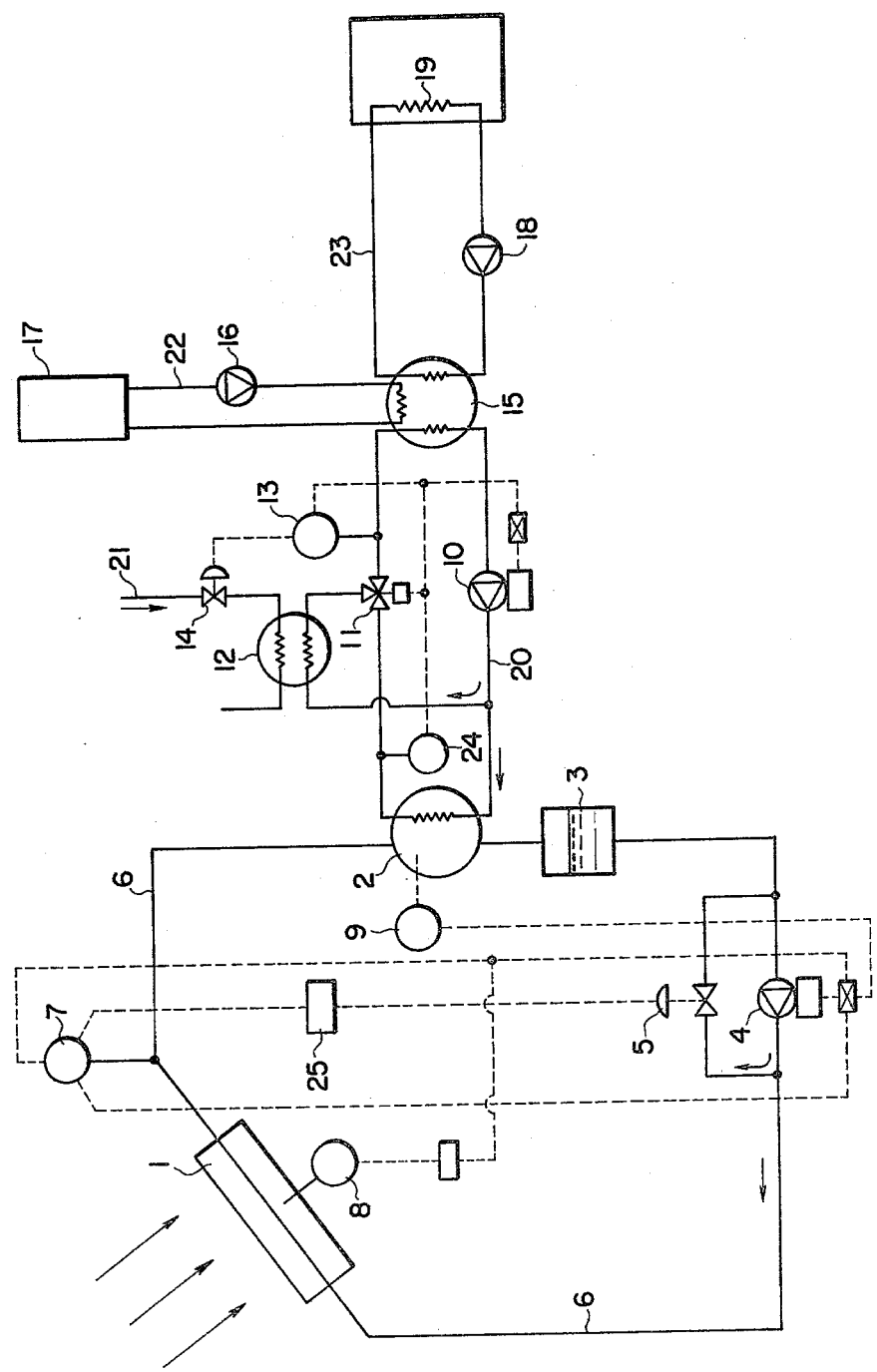

SOLAR ENERGY COLLECTING SYSTEM

BACKGROUND OF THE INVENTION

In the conventional solar energy collecting system, water or air is utilized as the working fluid or heat carrier and generally water is utilized because the density and specific heat of air are so small that the electric power required for circulating air in a heat collecting circuit is large in comparison with the case where water is utilized.

Since the solar energy collector is necessarily installed on the outside of a building, it is subjected to atmospheric temperature variations. Further, the temperature of a heat absorbing panel of the collector during winter night becomes lower than the atmospheric temperature by several degrees centigrade due to heat radiation from the heat collecting panel to the air. Therefore, there is a strong probability of the water freezing in the system during winter nights, even in moderate climate areas, resulting in damages to the system itself. In order to avoid this problem on winter nights, there have been proposed many methods which are classified into three groups, namely the addition of an antifreezing agent to the water, the removal of water from the energy collecting circuit and the forced circulation of water through the energy collecting circuit.

In the method involving the addition of an antifreezing agent to the water, the viscosity of the carrier fluid increases, causing an increase in the required pumping power. Further, it becomes relatively difficult to control the pH and density of the carrier fluid, otherwise, it requires much labor and high cost. In addition to these difficulties, when the amount of water to be used in the energy collecting system is large, the amount of the antifreezing agent becomes correspondingly large, causing the cost to be high.

In the method involving removing the water from the circuit, the removal itself is difficult when the circuit takes the form of a closed loop. Even if the removal is possible, the cost of replacement water becomes considerable and the circuit itself tends to corrode due to oxygen dissolved in the replacement water, resulting in a short useful lifetime of the energy collecting system. Further, the cost of an automatic control system therefor is high and a failure of the control system may damage the whole system.

In the method involving forced water circulation, a circulation pump is operated when the temperature of the energy collector is lowered to a predetermined value, so that heat in a heat storage tank is returned to the energy collector. In this method, the amount of heat to be returned to the collector is substantial on a winter night, resulting in that the effective utilization of solar energy becomes impossible and the electric power required to operate the pump increases.

There is another disadvantage inherent to the use of water as the working fluid. Since the heat transfer is performed by utilizing the specific heat of water, there must be a temperature difference between a first point and a second point to which a thermal energy is to be transferred from the first point. On the other hand, it is very difficult to arbitrarily set the temperatures of the solar collector and other load side devices associated therewith respectively. Therefore, even if water, which has the highest specific heat among other substances used, the amount of water becomes large, causing the need for large amounts of power for thermal energy transmission and large size piping.

Further, since lower heat collector efficiency is caused by higher heat collector temperature, the heat collector temperature should not be extremely higher than that needed.

A still further problem encountered in a cooling, heating and/or hot water supplying systems of the solar energy type is heat discharge in the moderate temperature seasons (spring and fall). Since, the size of the collector system installation is determined by the maximum cooling load, the maximum heating load and/or an area on a building permitted to install the system, the thermal energy generally exceeds the desired amount of energy for a building during the moderate seasons unless the building has an exceptionally large hot water supply load which is enough to completely utilize the collected thermal energy. For heating or the hot water supplying, this may occur also in summer. In order to overcome this problem, several methods have been proposed. These methods are to provide a heat storage device, to provide a heat discharge device, to drain down the working fluid from the solar collector, to stop a heat collecting pump so that the fluid is boiled in the collector and evaporated, and combinations of the above, etc.

These methods, however, have disadvantages as below.

In the method in which the heat storage device is used to store excess thermal energy, the storage device is expensive and thus it is impossible to practically install it. In the method in which the heat discharge device is used, the heat collecting pump, a heat discharge pump and a fan therefor, if necessary, must be operated during the heat discharging period. This requires much power and increases the cost of the whole system.

In the method in which water is drained down from the collector, the pipings in the collector are necessarily exposed to air. This is a cause of corrosion of the pipes. Further, when the collector is to be used, the collector must be refilled with water. If fresh water is used for the refill, oxygen dissolved therein causes corrosion of the pipings.

In the method in which the circulation pump is stopped to boil and evaporate water in the collector, impurities in water are condensed, which may become a source of corrosion problems. Further in this method, the portion of water which is evaporated must be refilled, providing the same problems as those in the drain method.

SUMMARY OF THE INVENTION

An object of the present invention is to provide a solar energy collecting system in which the problem of freezing of water as a working fluid which is inherent to the conventional solar energy collecting system using water as the working medium is resolved.

Another object of the present invention is to provide a solar energy collecting system in which the increase of power required to transmit thermal energy is minimized.

A further object of the present invention is to provide a solar energy collecting system in which the heat dissipation problem inherent to the conventional solar energy collecting system when used in the moderate seasons is resolved.

These objects are achieved, according to the present invention, by using a heat carrier such as carbonfluorohalide (trichloro-trifluoroethane ($CCl_2F$-

$CCl_2F_2$), for example) whose freezing point is low and which can be evaporated at a low temperature under a low pressure, in two-phase. In the present invention, the heat carrier in liquid phase is evaporated in a heat collector. The gas phase carrier is passed through a heat exchanger and condensed. The thermal energy is transmitted through the heat exchanger to a secondary circuit side. The carrier condensed and liquified in the heat exchanger is received by a receiver tank from which it is circulated by a pump to the heat collector to complete the cycle. This cycle is then repeated.

In the present invention, the latent heat of the working fluid is utilized to transmit the thermal energy. For this reason it becomes possible to reduce the amount of circulating fluid in comparison with the conventional solar energy collecting system utilizing the sensible heat of water, resulting in advantages in pipe sizes and pump powers. For example, when the sensible heat of water is utilized and there is a temperature difference of 5° C., the flow rate of water required to carry a thermal energy of 10,000 Kcal per hour is 2000 Kg/h, while, when trichloro-trifluoroethane is used as the working fluid and the latent heat thereof is utilized to transmit heat, the flow rate thereof is 320 Kg/h because the latent heat-thereof (liquid to gas) at 90° C. is 31.25 Kcal/Kg.

Since the flow rate of the circulating carrier is small as above, the pipe size for liquid phase carrier and the pump power can be minimized although the pipe size for the gas phase carrier may be somewhat large. Particularly, the minimization of the pump power is important in view of power economy.

Further, since the freezing point of the carrier used in the present invention is low and the gas phase carrier fills the interior of the heat collector disposed usually at the top of the building, there is no problem of freezing of the carrier even in the night time during which the pump is stopped.

As to the heat discharge in the moderate seasons, the pump is stopped to prevent the carrier in liquid phase from circulating through the system. Therefore, the gas phase carrier in the collector is overheated. However, since the heat transfer coefficient of the gas phase carrier is very small and the carrier is not decomposed at a temperature equal to or lower than 200° C. There is no problem of corrosion of the pipings due to the carrier itself. Although some portions of the heat collecting system may be superheated, the pressure becomes the saturated vapor pressure corresponding to the temperature of the liquid phase carrier in the receiver tank and never rises above that pressure. Therefore, the heat discharge problem can be resolved without power consumption and corrosion problems. In addition to this, in the present invention in which the carrier is evaporated in the heat collector, the heat transfer from a heat absorption panel of the heat collector to the carrier and the heat transfer in the heat exchanger from the carrier to water are of boiling and condensation, respectively, a larger heat transfer coefficient and a higher heat collecting efficiency than those obtainable by using heat transfer with turbulent flow can be expected.

BRIEF DESCRIPTION OF THE DRAWING

A single FIGURE shows an embodiment of the present invention when utilized for a cooling purpose.

DETAILED DESCRIPTION OF THE EMBODIMENT

A primary closed circuit is composed of a heat collector 1, a heat exchanger 2, a carrier receiver tank 3 and a parallel connection of a carrier circulating pump 4 and a control valve 5 all of which are connected in series by pipings 6. This primary circuit is filled with a carrier fluid capable of being evaporated at low temperature under low pressure, such as carbonfluorohalide in gas and liquid phases. Trichloro-trifluoroethane may be one of preferred examples of the carrier.

A secondary circuit is composed of the heat exchanger 2, a hot water circulating pump 10, a three-way valve 11, an absorption type refrigerator 15 as a utilization means, connected in series by pipings 20. The secondary circuit further comprises an auxiliary heater 12 connected in parallel with the heat exchanger 2. The auxiliary heater 12 is connected through a two-way valve 14 to an external heat source by pipings 21.

Although this embodiment will be described as being applied to solar cooling, it should be understood that the absorption type refrigerator 15 may be replaced by a heat radiator or a heat exchanger when applied to a solar heating or hot water supply.

In this embodiment, the refrigerator 15 is connected through a water cooling pump 16 to a cooling tower 17 and through a cool water circulating pump 18 to a heat radiator 19 by pipings 22 and 23, respectively.

A carrier temperature detector 7 is provided to detect the temperature of the gas phase carrier from the heat collector 1 and to provide a first signal proportional to the temperature to the control valve 5 and a second signal to the pump 4 under a certain conditions, and a surface temperature detector 8 is provided to detect the temperature of the outer surface of the heat collector 1 and to provide to the pump 4 a pump start signal when the temperature reaches at a set valve thereof.

A pressure detector 9 is provided to detect the pressure of the carrier in the heat exchanger 2 and to provide to the pump 4 a signal when the pressure exceeds a certain value. The operation of the pump 4 should be started when the solar energy collector 1 is heated above the set value to a degree sufficient to heat the carrier to be passed therethrough to a certain temperature, e.g., 90° C. Therefore, the set value of the surface temperature detector 8 should be higher than the carrier temperature to be attained and may be 110° C. when the carrier temperature to be attained is 90° C.

When pump 4 starts to operate, the liquid phase carrier flows through the piping 6 to the solar energy collector 1. At this time, however, the control valve 5 is opened so that the amount of the carrier to be supplied to the energy collector 1 is minimized during the starting time of the pump 4. In a normal operation after the starting of the pump operation, the control valve 5 is controlled by an output of the carrier temperature detector 7 so that the temperature of the carrier heated in the energy collector 1 is maintained substantially constant. That is, the opening of the control valve 5 is reduced when the temperature detected by the surface temperature detector 8 is lower than the setting temperature of the carrier temperature detector 7 corresponding to the desired carrier temperature 90° C. in this example.

In order to prevent the hunting effect of the carrier temperature at the starting of the system during which the temperature of the carrier varies abruptly, a delay timer 25 is inserted into between the carrier temperature detector 7 and the control valve 5. With this delay timer 25, the output of the carrier temperature detector 7 to be supplied to the control valve 5 is cut out for a predetermined time, causing the control valve 5 to be insensitive to the temperature variation for a predetermined time.

In a case where thermal energy demand on the load side is larger than the energy collected by the heat collector 1, the temperature of water emanating from the heat exchanger 2 in the secondary circuit may not rise to a desired value even if the temperature of the carrier at the output of the heat collector 1 is maintained at 90° C. In this case, the three-way valve 11 is controlled by the temperature detector 24 such that the temperature detected by the temperature detector 24 becomes a setting temperature thereof, 85° C. e.g. The temperature detector 24 provides an output to the three-way valve 11 when the temperature of water emanating from the heat exchanger 2 in the secondary circuit is lowered below a setting value thereof, e.g., 85° C. Upon the receipt of the output of the temperature detector 24, the three-way valve 11 is turned in one direction to reduce the water flow through the heat exchanger 2 and increase the water flow through the auxiliary heater 12, so that the temperature of water emanating from the three-way valve 11 and supplied to the utilization means is increased. The auxiliary heater 12 is supplied with a hot water or steam from a heat source (not shown) through the pipings 21. The amount of the hot water or steam to be supplied to the heater 12 is controlled by a control valve 14 which is controlled by an output of a temperature detector 13 disposed in the downstream side of the three-way valve 11 so that the maintenance of the temperature of water at the setting temperature of the detector 24 becomes much more effective.

In a case where the solar energy to be collected becomes very small with respect to the energy required in the load side, the control valve 5 is controlled by the detector 7 to minimize the amount of the carrier to be supplied to the collector 1. If the temperature detected by the detector 7 is lowered below 90° C. under the condition of the minimized carrier amount, the detector 7 provides a pump stop signal to stop the operation of the pump 4. In this state the amount of the hot water to be supplied to the heat exchanger 2 by the pump 10 in the secondary circuit is also minimized by the detector 24 and the three-way valve 11 controlled thereby, so that the heating is performed only by the auxiliary heater 12.

In a case where the solar energy collected is larger than the load demand, the vapour of the carrier supplied from the collector 1 to the heat exchanger 2 may partially condensed in the heat exchanger resulting in that the pressure and temperature in the collector system may be increased. The pressure detector 9 detects the increase of the pressure in the heat exchanger 2 and when the pressure reaches a setting pressure of the detector 9, e.g., 4.5 Kg/cm$^2$ abs (at 100° C.), it provides a signal to the pump 4 to stop the operation of the pump 4.

When this system is to be used for not cooling but hot water supply or heating, the absorption refrigerator provided in the heat utilization means may be replaced by a heat radiator or heat exchanger etc.

What is claimed is:

1. A solar energy collecting system utilizing latent heat transfer, comprising a primary closed circuit including, in series, a solar energy collector, a heat exchanger, a carrier receiver tank and a first circulating pump for circulating a heat carrier through said primary closed circuit, said carrier capable of evaporating at a low temperature under a low pressure, and a first control means responsive to surface temperatures of said solar energy collector, the temperature of said heat carrier emanating from said collector and a pressure in said heat exchanger and being operable to output a control signal to control the operation of said pump and the flow of fluid through a bypass circuit connected across said pump by opening and closing a control valve thereof to maintain the temperature of said carrier emanating from said collector at substantially a constant value, a secondary closed circuit including, in series, said heat exchanger, a utilization means, a second circulating pump for circulating water through said secondary circuit and a second control means responsive to the temperature of said water in said secondary circuit to maintain the temperature thereof at substantially a constant value.

2. A solar energy collecting system claimed in claim 1, wherein said first control means comprises a first means responsive to the temperature of said heat carrier emanating from said collector in said primary closed circuit to regulate an amount of said heat carrier to be supplied to said collector to thereby maintain said carrier temperature substantially constant, and a second means responsive to the temperature of said collector and to the pressure in said heat exchanger to control the starting and stopping operation of said first circulating pump.

3. A solar energy collecting system claimed in claim 2, wherein said first means includes said control valve connected in parallel to said first circulating pump and a carrier temperature detector having a set value, said carrier temperature detector being adapted to provide a valve open signal to said control valve when the temperature of said carrier emanating from said collector becomes higher than said set value and provide a valve close signal to said control valve when the temperature of said carrier emanating from said collector becomes lower than said set value.

4. A solar energy collecting system claimed in claim 3, wherein said second means comprises a surface temperature detector having a set value for detecting the temperature of a surface of said collector, said set value of said surface temperature detector being set higher than said set value of said carrier temperature detector, said surface temperature detector being adapted to provide a pump start signal to said pump when the surface temperature becomes higher than said set value, a pressure detector having a set value for detecting a pressure of said carrier in said heat exchanger, said pressure detector being adapted to provide a pump stop signal to said pump when the pressure of said carrier in said heat exchanger becomes higher than said set value thereof, said carrier temperature detector being adapted to provide a pump stop signal when said control valve is fully opened and the temperature of said carrier emanating from said collector becomes lower than said set value thereof.

5. A solar energy collecting system claimed in claim 4, wherein said first means further comprises a delay means connected between said carrier temperature detector and said control valve, said delay means being adapted to make said control valve insensitive for a predetermined time during the starting up of said system, during which the temperature of said carrier may vary abruptly.

6. A solar energy collecting system claimed in claim 3, wherein said first means further comprises a delay means connected between said carrier temperature detector and said control valve, said delay means being adapted to make said control valve insensitive for a predetermined time during the starting up of said system, during which the temperature of said carrier may vary abruptly.

7. A solar energy collecting system claimed in claims 3, 4, 5, or 6, wherein said second control means comprises a first water temperature detector for detecting the temperature of said water emanating from said heat exchanger, said first water temperature detector having a set value lower than said set value of said carrier temperature detector of said first control means and being adapted to provide a pump start signal to said pump when the water temperature becomes higher than said set value thereof.

8. A solar energy collecting system claimed in claim 7, further comprising an auxiliary heat source connected in parallel to said heat exchanger to provide an additional heat to said water when the water temperature is lower than said set value of said first water temperature detector.

9. A solar energy collecting system claimed in claim 7, wherein said heat carrier is carbonfluorohalide.

10. A solar energy collecting system claimed in claim 8, further comprising a second water temperature detector and wherein an amount of heat to be supplied by said auxiliary heat source is controlled by said second water temperature detector such that the heat to be supplied to said utilization means is maintained substantially constant.

11. A solar energy collecting system claimed in claim 8, wherein said heat carrier is carbonfluorohalide.

12. A solar energy collecting system claimed in claim 10, wherein said heat carrier is carbonfluorohalide.

13. A solar energy collecting system claimed in any of claims 1, 2, 3, 4, 5 or 6, wherein said heat carrier is carbonfluorohalide.

14. A solar energy collecting system claimed in claim 13, wherein said heat carrier is trichloro-trifluoroethane.

* * * * *